United States Patent [19]

Sessink

[11] Patent Number: 4,878,252

[45] Date of Patent: Oct. 31, 1989

[54] MODIFIED MULTI-PATH DETECTOR

[75] Inventor: Franciscus J. A. M. Sessink, Eindhoven, Netherlands

[73] Assignee: U. S. Philips Corporation, New York, N.Y.

[21] Appl. No.: 126,382

[22] Filed: Nov. 30, 1987

[30] Foreign Application Priority Data

Dec. 18, 1986 [NL] Netherlands .................. 8603221

[51] Int. Cl.$^4$ .......................................... H04B 1/10
[52] U.S. Cl. ................................. 455/276; 455/278; 455/65
[58] Field of Search ........ 455/276, 277, 278, 132–136, 455/65; 375/100

[56] References Cited

U.S. PATENT DOCUMENTS

| 4,512,034 | 4/1985 | Greerstein et al. | 455/139 |
| 4,566,133 | 1/1986 | Rambo | 455/277 |
| 4,726,073 | 2/1988 | Sessink | 455/278 X |

FOREIGN PATENT DOCUMENTS

| 0141218 | 9/1984 | European Pat. Off. | |
| 0004722 | 1/1977 | Japan | 455/135 |

Primary Examiner—Robert L. Griffin
Assistant Examiner—Ralph Smith
Attorney, Agent, or Firm—Michael E. Marion

[57] ABSTRACT

A receiver comprising a multi-path detector which comprises a frequency noise peak detector, an AM-detector and a weighting circuit. When noise peaks and amplitude modulations occur in an antenna input signal selected by a diversity switch on account of a control signal of the weighting circuit one of a number of antennas is switched to. This switching is audible to an annoying degree. By inserting a threshold arrangement (31, 32) in the detector, by means of a low-pass filter and a rectifier circuit, an instantaneous threshold voltage is generated varying with the frequency swing of the modulating signal. With a large swing, corresponding with a large amplitude of the modulating signal, switching is audible to a less annoying degree. On the other hand, at moments when the modulating signal has a small amplitude, switching may take place more frequently and is less audible because of the small amplitude of the modulating signal. Improved reliability in detecting multi-path distortion is achieved by also supplying the instantaneous threshold voltage to the AM-detector.

5 Claims, 1 Drawing Sheet

MODIFIED MULTI-PATH DETECTOR

BACKGROUND OF THE INVENTION

The invention relates to a receiver for angle-modulated signals, coming from one or a plurality of antennas, comprising a diversity switch having a signal input connected to at least one antenna, a signal output and a control input for selecting at the signal output an angle-modulated signal by means of a control signal on the control input, and comprising a multi-path detector coupled to the signal output and connected to the control input for supplying the control signal to the control input when the multi-path detector detects multi-path distortion in the selected signal, the multi-path detector comprising a threshold arrangement coupled to the output of the diversity switch for generating a threshold voltage having an amplitude value depending on the frequency swing of the angle-modulated signal, and being arranged such that the variation of the sensitivity for detecting multi-path distortion corresponds to the variation of the threshold amplitude value.

Such a multi-path detector suitable for use in space diversity receivers, for example, is known from the European Patent Specification No. 141 218. Such receivers are designed as FM receivers, for example, and coupled to a plurality of interspaced antennas. Depending on the multi-path distortion of an input signal received on an antenna the receiver is switched to one or a plurality of other antennas with the aid of the multi-path detector for receiving an input signal having a lower multi-path distortion. Known multi-path detectors comprise an AM-detector and/or a frequency disturbance peak detector. In the abovementioned European Patent Specification multi-path distortion is detected at simultaneously occurring sharp amplitude minimums and frequency disturbance peaks in the input signal.

The above publication likewise discloses that it is possible to have the variation of the sensitivity of the multi-path detector depend on the amplitude value of a threshold voltage for detecting multi-path distortion, so that only when the signal representing multi-path distortion exceeds the threshold value, switching over can be effected. This threshold voltage can depend on the mean frequency swing and thus vary gradually. Switching, taking place after detection of multi-path distortion, generally causes amplitude and phase-jumps in the high-frequency signal. In audio FM-receivers amplitude jumps will then arise in the audio signal, which are discernible to an annoying degree to the human ear, more specifically due to its great sensitivity to such jumps.

SUMMARY OF THE INVENTION

The object of the invention is to realise a receiver in which the discernible impact on the audio signal, audible to an annoying degree and occurring when a different received signal is switched to is reduced.

Thereto the receiver in accordance with the invention is characterized in that the threshold voltage has an amplitude value instantaneously varying with the frequency swing of the angle-modulated signal, and comprises a multi-path detector having a sensitivity the variation of which instantaneously corresponds to the variation of the amplitude value of the threshold voltage. As the threshold voltage immediately varies with the frequency swing and not after some time has elapsed as with the known receiver, it is achieved that when the angle-modulated signal shows a slight swing, at zero-crossings of the demodulated audio signal, that is the sensitivity to noise peaks during the detection of multi-path distortion will be larger than the sensitivity to corresponding noise peaks when the angle-modulated signal shows a large swing, so at large amplitudes of the audio signal. Accordingly, on the one hand it will be more likely to switch at zero-crossings of the audio signal than at large amplitudes of the audio signal when multi-path distortion has been detected. The latter switching is advantageous in that the receiver is enabled to search for input signals having a lower multi-path distortion, but without this leading to an annoying audible impact on the quality of the audio signal due to switching taking place at the aforesaid zero-crossings. On the other hand, however, at moments when the angle-modulated signal instantaneously has a large swing, the level of the noise peaks should exceed the threshold voltage value varying with the large swing so as to detect multi-path distortion successfully. Exceeding the threshold voltage value will limit the highly annoying audible effect of the switching especially at a large instantaneous audio amplitude.

More specifically, in automobile receivers the available selectivity filters have a limited bandwidth, so as to let the transmitter frequencies lying close together cause the least possible disturbance to each other on reception. Consequently, at a larger swing in the received angle-modulated signal, amplitude-modulations having frequency noise peaks are produced in the receiver due to this limited bandwidth, which are detected as multi-path distortion by the multi-path detector. The multi-path detector in the receiver erroneously responding to this and switching is likewise reduced, as the latter noise peaks have to exceed the instantaneous values of the equivalently large threshold voltage in order to successfully detect multi-path distortion. However, on detection of considerable multi-path distortion in the angle-modulated signal, with the level of the noise peaks exceeding the value of the threshold voltage, the multi-path detector will respond indeed.

In a first embodiment of the receiver, in which the multi-path detector comprises a comparator circuit having two inputs, of which a first input is designed for supplying a signal which depends on the extent of multi-path distortion in the selected angle-modulated signal, the receiver in accordance with the invention is characterized in that the threshold arrangement is composed of a series arrangement coupled to the intermediate-frequency section of the receiver, this series arrangement comprising a low-pass filter and a rectifier circuit and an output connected to the second input of the comparator circuit.

The advantage of this embodiment of the receiver is that the instantaneous valuing of the threshold voltage can be carried out when a multi-path detector with a frequency noise-peak detector, or a multi-path detector with an AM detector is used or when both are used.

A second simple embodiment of the receiver in accordance with the invention wherein the multi-path detector comprises a frequency noise peak detector, is characterized in that the output of the frequency noise peak detector is connected to the first input of the comparator circuit.

A third simple embodiment of the receiver in accordance with the invention wherein the multi-path detector comprises an AM-detector is characterized in that the output of the AM-detector is connected to the first input of the comparator circuit.

The invention further relates to a multi-path detector to be used in the receiver.

BRIEF DESCRIPTION OF THE DRAWING

The invention and its advantages will be further discussed with reference to the following diagram wherein.

DETAILED DESCRIPTION OF THE INVENTION

Figure 1:
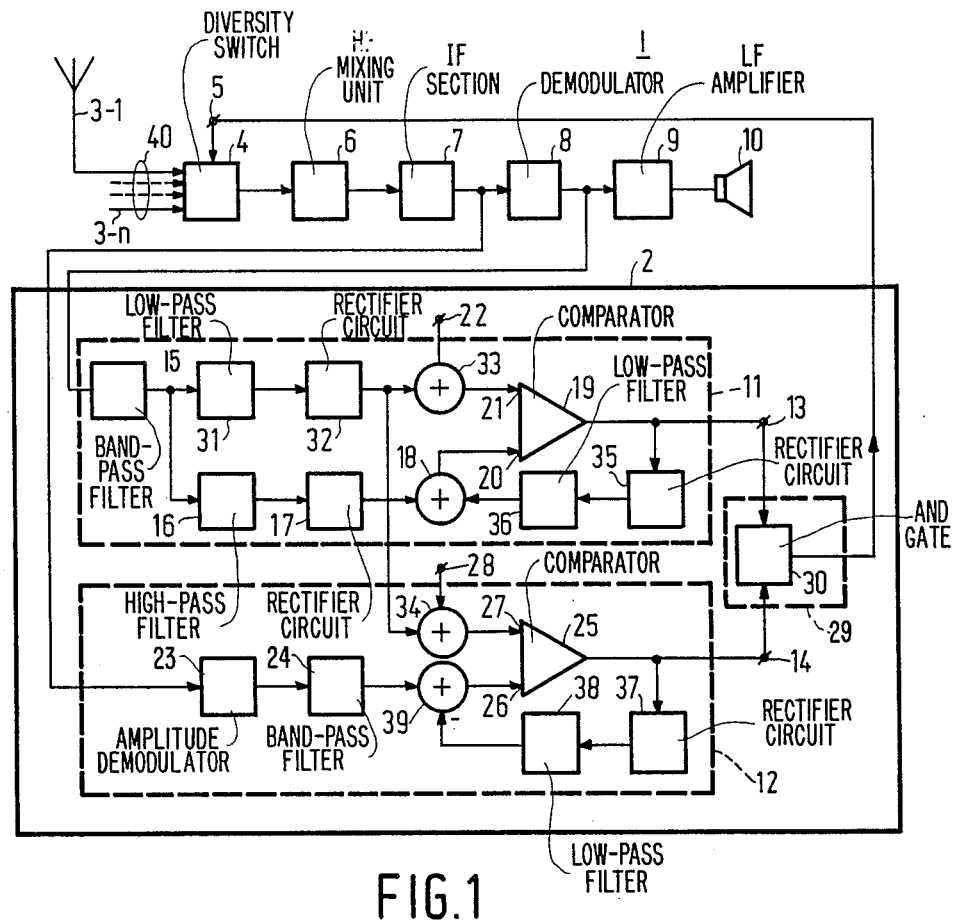
FIG. 1 shows embodiments of a receiver in accordance with the invention.

The receiver 1 shown in FIG. 1 comprises a multi-path detector 2 for detecting a multi-path distortion in received angle-modulated input signals. Such a receiver 1, wherein generally a plurality of spaced antennas 3-1 to 3-n are used, is designated space-diversity receiver. The receiver 1 comprises a diversity switch 4 having a signal input 40, to which antennas 3-1 to 3-n are connected. A control signal to control input 5 of the diversity switch 4 causes a switching over from the one antenna to the other, or if so desired from a combination of antennas or to a combination of antennas. In the latter case, for example, the sum signals and/or the difference signals are formed from the combinations of input signals and one of these signals is further processed as a selected input signal in the receiver 1. If the receiver 1 comprises a diversity switch 4 to which one antenna 3-1 is connected, switching to an other input signal is effected, for example, by changing the direction in which antenna 3-1 is mainly sensitive to electromagnetic waves. In the latter case, for example, the diversity switch 4 additionally switches part of the antenna 3-1 to a further part of the antenna 3-1 already connected to the diversity switch 4. This is advantageous in that a twin-conductor combination between the antenna 3-1 and the diversity switch 4 will then suffice.

The receiver 1 comprises a high-frequency mixing unit 6, to which the selected input signal is applied, and which further comprises successively interconnected: an intermediate-frequency section 7, a demodulator 8, a low-frequency amplifier 9 and in cases where receiver 1 is designed as an audio receiver, a loudspeaker 10. For receiving angle-modulated input signals, in the form of frequency or phase-modulated input signals, the demodulator 8 is designed as a frequency or phase-demodulator.

The shown multi-path detector 2 comprises a frequency noise peak detector 11 and/or an AM detector 12. In FIG. 1 the detector 11 is connected to the demodulator 8 and the AM detector 12 is connected to the intermediate-frequency section 7. The frequency noise peak detector 11 has an output 13 to which a noise peak signal is applied, as will be explained hereinafter. This signal is produced when detector 11 detects multi-path distortion in the form of noise peaks in the received angle-modulated input signal. The signal indicating the noise peaks can be applied directly to the control input 5 of the diversity switch 4 in a way not shown in the figure. The AM-detector 12 has an output 14 to which an AM-indication signal is applied when the AM-detector 12 detects multi-path distortion in the form of amplitude modulations in the received angle-modulated input signal. The AM-indication signal can likewise be applied directly to the control input 5 of the diversity switch 4 in a way not shown in the figure.

The noise peak detector 11 successively comprises a series arrangement composed of a band-pass filter 15, a high-pass filter 16, a rectifier circuit 17, a summing circuit 18 and a comparator circuit 19 for supplying a bivalent noise peak indication signal to the indication output 13. The comparator circuit 19 comprises inputs 20 and 21. The input 20 is connected to the summing output of the summing circuit 18 and in the figure input 21 is coupled via a summing circuit 33 to a terminal 22 to which a direct voltage source can be connected which is not shown, for supplying a threshold bias voltage. The bandpass filter 15, connected to the demodulator 8 in the figure, has a passband exceeding the bandwidth of the received angle-modulated signal and ranging from for example 15 Hz to approximately 200 kHz. The portion of this signal exceeding, for example, 50 to 60 kHz is allowed to pass through the high-pass filter 16 and is subsequently rectified by the rectifier circuit 17. At the moments when the angle-modulated signal is subjected to multi-path distortion the rectified signal supplied to the summing circuit 18 will show noise peaks which are commonly known. At the moments when the level of the noise peaks on input 20 exceeds the level of the bias voltage on input 21, the comparator circuit 19 supplies the signal indicating the noise peak to the output 13.

The AM-detector 12 comprises an amplitude demodulator 23, connected to the intermediate-frequency section 7 in the figure, a band-pass filter 24 connected in series to the demodulator and a comparator circuit 25. The comparator circuit 25 has two inputs 26 and 27. In the figure the input 26 is coupled to the band-pass filter 24 via a summing circuit 39, and via a summing circuit 34 input 27 is coupled to a terminal 28 to which a direct voltage source which is not shown, can be connected for supplying a threshold bias voltage. The pass-band of the bandpass filter 24 covers an area wherein the frequency components are present of the amplitude modulations caused by multi-path distortion. The pass-band, for example, ranges from 5 Hz to 50 kHz. At moments when the value of the amplitude modulation exceeds the value of the bias voltage on the input 27, the comparator circuit 25 will supply the AM-indication signal to output 14.

When using the two detectors 11 and 12, the multi-path detector 2, as shown in the figure, comprises a weighting circuit 29 connected to the two detectors, for supplying the control signal to the control input 5 solely in cases when the two indication signals are simultaneous. The weighting circuit 29 is then designed as an AND-gate circuit 30 connected to the indication outputs 13 and 14, the gate circuit in its turn connected to the control input 5 of diversity switch 4.

The following should be observed as to the requirements which a diversity receiver has to meet with respect to switching properly. On the one hand this switching should be limited as it is audible in loudspeaker 10 in most cases due to the associated amplitude jumps in the audio signal. More specifically, switching should be limited more as the quality of the receiver signal is better. This is in line with the understanding that the maximum permissible switching frequency above which the switching is audible to an annoying degree will decrease according as the received signal has a better signal-to-noise ratio on the other hand, switching should not be done too little as in that case the multi-path distortion of the selected input signal itself will be audible to an annoying degree. Another aspect relates to the reliability with which a multi-path distortion is detected; the susceptibility to noise pulses of the multi-path detector. More specifically, the periodic noise pulses, but also the periodic switching appear to be most annoying in practice. In receiver 1 the detection of multi-path distortion and the subsequent switching is realised in a way in which the annoying audible impact of switching on the quality of the audio signal is limited.

Figure 2:
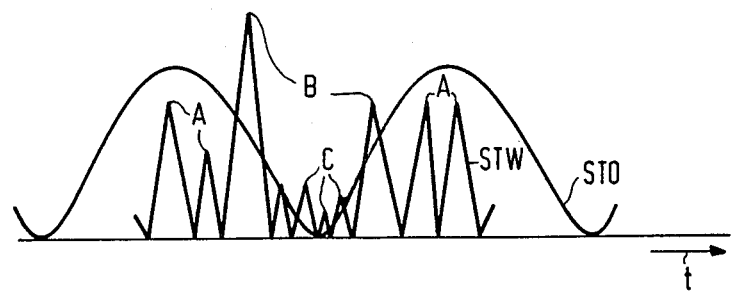
FIG. 2 shows a graph of possible shapes of the signals occurring in the receiver as shown in FIG. 1, represented as a function of time.

Thereto the frequency noise peak detector 11 of the receiver 1 comprises a threshold arrangement (31, 32) for producing a threshold voltage having an instantaneous value varying with the frequency swing of the angle-modulated signal, wherein the noise peak indication signal is produced when the instantaneous value of the threshold voltage is exceeded by the amplitude of the noise peaks. A threshold arrangement (31, 32) is shown in the figure by way of a simple embodiment of a low-pass filter 31 connected to the band-pass filter 15 and connected in series to a rectifier circuit 32, the latter being connected to the summing circuit 33. If so desired the low-pass filter 31 and the rectifier circuit 32 can be interchanged. In the embodiment shown the input 21 is connected to the sum output of the summing circuit 33, whilst the terminal 22 is connected to the summing circuit 33. The cross-over frequency of the low-pass filter 31, for example, is situated at 5 kHz, so that the low-frequency components of the audio signal are allowed to pass through the filter 31. Thus, the output signal of the rectifier circuit 32 applied to the summing circuit 33 and hence the threshold voltage on input 21 instantaneously vary with the rectified instantaneous swing of the modulating audio signal. The instantaneous threshold voltage on input 21, having a varying value, is represented in FIG. 2 by the letters STO. The consequence of this instantaneous variation of value is that at a slight swing of the angle-modulated signal, thus at zero-crossings of the demodulated audio signal, the susceptibility to noise peaks on detection of the multi-path distortion is larger than the susceptibility to associated noise peaks at a large swing of the angle-modulated signal, thus at large amplitudes of the audio signal. Accordingly, on the one hand switching is more likely to take place after detecting multi-path distortion at zero crossings of the audio signal than at large amplitudes of the audio signal. The advantage is that this enhanced switching rate enables the receiver 1 to search for received signals having a lower multi-path distortion, but without this leading to an audible deterioration of the quality of the audio signal as a result of switching at the aforesaid zero crossings. On the other hand, for successfully detecting multi-path distortion at instants at which the angle-modulated signal shows a large swing, the level of the noise peaks has to exceed the instantaneous value of the threshold voltage on input 21 varying with the large swing. Consequently, audible switching is limited specially at a large audio amplitude. This matter will further be explained with reference to FIG. 2.

The matter of limiting the switching operations at a large swing of the angle-modulated signal takes on an additional meaning when considering the problem of noise peaks occurring in the angle-modulated signal, for example in the case of noise due to overdemodulation, which peaks are caused by the limited bandwidth of an automobile radio, more specifically, a bandwidth of the selectivity filters generally available in the receiver 1, such as, for example, those available in the high-frequency mixing unit 6 or the intermediate-frequency section 7. Erroneously responding to this disturbance by the multipath detector 2 in the receiver 1 and switching is limited, as the instantaneous value of the accordingly large threshold voltage has to be exceeded by the latter noise peaks so as to successfully detect multi-path distortion. When detecting considerable multi-path distortion of the angle-modulated signal, though, with the level of the noise peaks rising above the value of the threshold voltage for a longer period of time, the multi-path detector 2 does respond.

FIG. 2 shows a graphical representation of the matter described hereinbefore. The letters STW in this figure represent the noise peak signal at the input 20 of the comparator circuit 19. This figure further shows examples of different types of noise peaks explained hereinbefore, in which:

A represents the noise peaks originating in the receiver 1 itself due to the aforementioned limited bandwidth of the selectivity filters. The figure shows that the frequency noise peak detector 11 does not respond to this as the level of these noise peaks at the instant shown does not rise above the instantaneous value of the threshold voltage STO;

B represents the noise peaks caused by considerable multi-path distortion, which peaks cause the frequency noise peak detector 11 to respond; and C represents the noise peaks having a relatively small amplitude, which are detected because of this small amplitude of the audio signal STO shown in the figure and to which the frequency noise peak detector 11 does respond. However, as the instantaneous swing and consequently the instantaneous amplitude of the demodulated audio signal are small, switching at this moment will result in a less annoying and less audible switching of the receiver 1.

In the embodiment shown the output signal of the rectifier circuit 32 is likewise applied to a summing circuit 34 comprised in the AM-detector 12. The terminal 28 is then likewise connected to the summing circuit 34. The output of the summing circuit 34 is then connected to the input 27 of the comparator circuit 25. Thus, the value of a further threshold voltage on the input 27 shows an instantaneous variation with the rectified instantaneous swing of the modulating audio signal. If the value of the further threshold voltage is exceeded as a result of the amplitude modulations at the output of the band-pass filter 24, the comparator circuit 25 will supply the AM-indication signal to the indication output 14. The detection of multi-path distortion, more specifically, by means of the two instantaneous threshold voltages will add to detecting multi-path distortion in a reliable manner, thereby avoiding unnecessary switching as a result of noise pulses being wrongly considered multi-path distortion.

The embodiment of the receiver 1 represented in the figure further comprises two feedback circuits (35, 36) and (37, 38). The first feedback circuit (35, 36) in the noise peak detector 11 switched between the indication output 13 and the summing circuit 18, comprises the series arrangement of a rectifier circuit 35, with a low-pass filter 36. The second feedback circuit (37, 38), in the AM-detector 12 switched between the indication output 14 and the input 26 of the comparator circuit 25, comprises the series arrangement of a rectifier circuit 37 with a low-pass filter 38 and another summing circuit 39. The band-pass filter 24 is then connected to the (-) input of the summing circuit 39. Th reason for using these circuits is the wish to get the switching behaviour more in line with the above inventive idea, that the maximum permissible switching frequency above which switching is audible to an annoying degree decreases according as the received signal has a better signal-to-noise ratio. Thereto the cross-over frequency of the low-pass filter 36 is, for example, 250 Hz and the cross-over frequency of the low-pass filter 38 is, for example, 5 Hz. By thus inserting the circuits (35, 36) and (37, 38), it is achieved that each time the indication signals appear at the outputs 13 and 14 of the comparator circuits 19 and 25 the integrating effect of the low-pass filters 36 and 38 affect the voltage values on the inputs 20 and 26 such that switching takes place according to this inventive idea.

I claim:

1. A receiver for angle-modulated signals, coming from one or a plurality of antennas, comprising a diversity switch having a signal input connected to at least one antenna, a signal output and a control input for selecting at the signal output an angle-modulated signal by means of a control signal on the control input, and comprising a multi-path detector coupled to the signal output and connected to the control input for supplying the control signal to the control input when the multi-path detector detects multi-path distortion in the selected signal, the multi-path detector comprising a threshold arrangement coupled to the output of the diversity switch for generating a threshold voltage having an amplitude value depending on the frequency swing of the angle-modulated signal, characterized in that the threshold voltage has an amplitude value instantaneously varying with the frequency swing of the angle-modulated signal, and in that said multi-path detector has a sensitivity the variation of which instantaneously corresponds to the variation of the amplitude value of the threshold voltage.

2. A receiver as claimed in claim 1, in which the multi-path detector comprises a comparator circuit having two inputs, of which a first input is designed for supplying a signal which depends on the extend of multi-path distortion in the selected angle-modulated signal, characterized in that the threshold arrangement is composed of a series arrangement coupled to the intermediate frequency section of the receiver, this series arrangement comprising a low-pass filter and a rectifier circuit and an output connected to the second input of the comparator circuit.

3. A receiver as claimed in claim 2, wherein the multi-path detector comprises a frequency noise peak detector, characterized in that the output of the frequency noise peak detector is connected to the first input of the comparator circuit.

4. A receiver as claimed in claim 2, wherein the multi-path detector comprises an AM-detector, characterized in that the output of the AM-detector is connected to the first input of the comparator circuit.

5. A multi-path detector for use in a receiver for angle-modulated signals comprising a diversity switch having a signal input connected to at least one antenna, a signal output and a control input for selecting at the signal output an angle-modulated signal by means of a control signal on the control input, said multi-path detector being coupled to the signal output and connected to the control input for supplying the control signal to the control input when said multi-path detector detects multi-path distortion in the selected signal, said multi-path detector comprising a threshold arrangement coupled to the output of the diversity switch for generating a threshold voltage having an amplitude value depending on the frequency swing of the angle modulated signal, and said multi-path detector having a sensitivity the variation of which corresponds to the variation of the amplitude value of the threshold voltage.

* * * * *